US007991857B2

(12) United States Patent
Berg et al.

(10) Patent No.: US 7,991,857 B2
(45) Date of Patent: Aug. 2, 2011

(54) BROADCASTING A MESSAGE IN A PARALLEL COMPUTER

(75) Inventors: Jeremy E. Berg, Rochester, MN (US); Ahmad A. Faraj, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 606 days.

(21) Appl. No.: 12/053,902

(22) Filed: Mar. 24, 2008

(65) Prior Publication Data

US 2009/0240838 A1      Sep. 24, 2009

(51) Int. Cl.
*H04L 12/437* (2006.01)
*G06F 15/16* (2006.01)
(52) U.S. Cl. ......... 709/220; 709/203; 709/228; 370/216
(58) Field of Classification Search .................. 709/203, 709/220, 228; 370/216, 222, 406
See application file for complete search history.

(56) References Cited

U.S. PATENT DOCUMENTS

| | | |
|---|---|---|
| 4,715,032 A | 12/1987 | Nilsson |
| 4,843,540 A | 6/1989 | Stolfo |
| 5,105,424 A | 4/1992 | Flaig et al. |
| 5,333,279 A | 7/1994 | Dunning |
| 5,513,371 A | 4/1996 | Cypher et al. |
| 5,541,914 A | 7/1996 | Krishnamoorthy et al. |
| 5,617,538 A | 4/1997 | Heller |
| 5,721,828 A | 2/1998 | Frisch |
| 5,822,604 A | 10/1998 | Ogasawara et al. |
| 5,832,215 A | 11/1998 | Kato et al. |
| 5,864,712 A | 1/1999 | Carmichael et al. |
| 5,878,241 A | 3/1999 | Wilkinson et al. |
| 5,892,923 A | 4/1999 | Yasuda et al. |
| 5,937,202 A | 8/1999 | Crosetto et al. |
| 5,949,988 A | 9/1999 | Feisullin et al. |
| 5,958,017 A | 9/1999 | Scott et al. |
| 6,000,024 A | 12/1999 | Maddox et al. |
| 6,067,609 A | 5/2000 | Meeker et al. |
| 6,076,131 A | 6/2000 | Nugent |

(Continued)

FOREIGN PATENT DOCUMENTS

EP     1835414 A2    9/2007

OTHER PUBLICATIONS

Sunggu Lee; Shin, K.G., "Interleaved all-to-all reliable broadcast on meshes and hypercubes," Parallel and Distributed Systems, IEEE Transactions on, vol. 5, pp. 449-458, May 1994.

(Continued)

*Primary Examiner* — Khanh Q Dinh
(74) *Attorney, Agent, or Firm* — Biggers & Ohanian, LLP

(57) ABSTRACT

Methods, systems, and products are disclosed for broadcasting a message in a parallel computer. The parallel computer includes a plurality of compute nodes connected together using a data communications network. The data communications network optimized for point to point data communications and is characterized by at least two dimensions. The compute nodes are organized into at least one operational group of compute nodes for collective parallel operations of the parallel computer. One compute node of the operational group assigned to be a logical root. Broadcasting a message in a parallel computer includes: establishing a Hamiltonian path along all of the compute nodes in at least one plane of the data communications network and in the operational group; and broadcasting, by the logical root to the remaining compute nodes, the logical root's message along the established Hamiltonian path.

6 Claims, 15 Drawing Sheets

U.S. PATENT DOCUMENTS

| | | | |
|---|---|---|---|
| 6,212,617 | B1 | 4/2001 | Hardwick |
| 6,272,548 | B1 | 8/2001 | Cotter et al. |
| 6,289,424 | B1 | 9/2001 | Stevens |
| 6,292,822 | B1 | 9/2001 | Hardwick |
| 6,334,138 | B1 | 12/2001 | Kureya |
| 6,480,885 | B1 | 11/2002 | Olivier |
| 6,714,552 | B1 * | 3/2004 | Cotter .................... 370/406 |
| 6,742,063 | B1 | 5/2004 | Hellum et al. |
| 6,754,211 | B1 | 6/2004 | Brown |
| 6,914,606 | B2 | 7/2005 | Amemiya et al. |
| 7,133,359 | B2 * | 11/2006 | Weis .................... 370/222 |
| 7,263,598 | B2 | 8/2007 | Ambuel |
| 7,284,033 | B2 | 10/2007 | Jhani |
| 7,496,699 | B2 | 2/2009 | Pope et al. |
| 7,499,468 | B2 * | 3/2009 | Montgomery, Jr. ........... 370/453 |
| 7,539,989 | B2 | 5/2009 | Blackmore et al. |
| 7,664,110 | B1 | 2/2010 | Lovett et al. |
| 2002/0016901 | A1 | 2/2002 | Carvey et al. |
| 2002/0144027 | A1 | 10/2002 | Schmisseur |
| 2003/0188054 | A1 | 10/2003 | Yosimoto et al. |
| 2003/0212877 | A1 | 11/2003 | Dally et al. |
| 2004/0034678 | A1 | 2/2004 | Kuszmaul et al. |
| 2004/0073590 | A1 | 4/2004 | Bhanot et al. |
| 2005/0094577 | A1 | 5/2005 | Ashwood-Smith |
| 2005/0165980 | A1 | 7/2005 | Clayton et al. |
| 2005/0243711 | A1 * | 11/2005 | Alicherry et al. ............. 370/216 |
| 2005/0286411 | A1 * | 12/2005 | Alicherry et al. ............. 370/216 |
| 2006/0168359 | A1 | 7/2006 | Bissessur et al. |
| 2006/0179181 | A1 | 8/2006 | Seong |
| 2007/0110063 | A1 | 5/2007 | Tang et al. |
| 2007/0174558 | A1 | 7/2007 | Jia et al. |
| 2007/0288935 | A1 | 12/2007 | Tannenbaum et al. |
| 2009/0064176 | A1 | 3/2009 | Ohly et al. |
| 2009/0196361 | A1 * | 8/2009 | Chan et al. .................... 375/260 |
| 2009/0292905 | A1 | 11/2009 | Faraj |

OTHER PUBLICATIONS

Wikipedia. "Depth-First Search" May 5, 2007. http://web.archive.org/web/20070505212029/http://en.wikipedia.org/wiki/Depth-first_Search.

Bruck J., et al. Efficient Algorithms for all-to-all communications in multiportmessage-passing systems, Parallel and Distributed Systems, IEEE Transactions on, vol. 8, Issue: 11, pp. 1143-1156, Nov. 1997.

U.S. Appl. No. 60/271,124, filed Feb. 24, 2001, pp. 12-13, 27 and 42-43.

Sistare, et al.; Optimization of MPI collectives on clusters of large-scale SMP's, Conference on High Performance Networking and Computing, Proceedings of the 1999 ACM/IEEE conference on Supercomputing; 1999.

Tanenbaum, Structured Computer Organization, Second Edition, Prentice-Hall, Inc., 1984.

Rosenberg; Dictionarty of Computers, Information Processing & Telecommunications, Second Edition, John Wiley & Sons, 1987.

Herbordt, M.C., Weems, C.C.; "Computing Parallel Prefix and Reduction Using Coterie Structures"; Frontiers of Massively Parallel Computation; 1992; Fourth Symposium; Oct. 19-21, 1992; pp. 141-149.

Fisher, et al.; "Computing the Hough Transform on a Scar Line Array Processor"; IEEE Transactions on Pattern Analysis and Machine Intelligence; vol. II, No. 3; Mar. 1989; pp. 262-265.

Office Action, U.S. Appl. No. 11/279,620, Mar. 4, 2008.
Office Action, U.S. Appl. No. 11/279,620, Sep. 3, 2008.
Office Action, U.S. Appl. No. 11/279,620, Dec. 29, 2008.
Office Action, U.S. Appl. No. 11/769,367, Apr. 3, 2009.
Office Action, U.S. Appl. No. 11/459,387, Dec. 13, 2007.
Office Action, U.S. Appl. No. 11/459,387, Jul. 11, 2008.
Office Action, U.S. Appl. No. 11/459,387, Mar. 18, 2009.
Office Action, U.S. Appl. No. 11/737,286, Feb. 9, 2009.
Office Action, U.S. Appl. No. 11/737,209, Jul. 20, 2009.
Office Action, U.S. Appl. No. 11/843,090, Sep. 4, 2009.

M. Matsuda, T. Koduh, Y. Kodama, R. Takano, Y. Ishikawa, "Efficient MPI Collective Operations for Clusters in Long-and-Fast Networks," cluster, pp. 1-9, 2006 IEEE International Conference on Cluster Computing, Sep. 2006.

DADO: A Tree-Structured Machine Architecture for Production Systems, Stolfo et al. AAAI Proceedings, 1982, Columbia University.

Eunseuk Oh, An All-Reduce Operation in Star Networks Using All-to-All Broadcast Communication Patterns, 2005, 1-8.

Xin Yuan, Bandwidth Efficient All-reduce Operation on Tree Topologies, 2001, 1-8.

Final Office Action, U.S. Appl. No. 11/769,367, Sep. 28, 2010.
Final Office Action, U.S. Appl. No. 12/053,842, Oct. 18, 2010.
Advisory Action, U.S. Appl. No. 12/053,842, Jan. 11, 2011.
Office Action, U.S. Appl. No. 12/053,842, Mar. 1, 2011.
Office Action, U.S. Appl. No. 12/503,902, Oct. 6, 2010.
Office Action, U.S. Appl. No. 12/060,492, May 27, 2010.
Final Office Action, U.S. Appl. No. 12/060,492, Dec. 2, 2010.
Office Action, U.S. Appl. No. 12/124,763, Oct. 14, 2010.
Office Action, U.S. Appl. No. 12/124,756, Oct. 18, 2010.

* cited by examiner

Compute Nodes In An Operational Group 902

Logical Root 900

• Represents A Compute Node
---- Represents A Link Between Adjacent Nodes
→ Line Broadcast Path

BROADCASTING A MESSAGE IN A PARALLEL COMPUTER

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, systems, and products for broadcasting a message in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory needed for message buffers and latency in the data communications among nodes. Designs of parallel computers use specially designed data communications links so that the communication overhead will be small but it is the parallel algorithm that decides the volume of the traffic.

Many data communications network topologies are used for message passing among nodes in parallel computers. Such network topologies may include for example, a tree, a rectangular mesh, and a torus. In a tree network, the nodes typically are connected into a binary tree: each node typically has a parent and two children (although some nodes may only have zero children or one child, depending on the hardware configuration). A tree network typically supports communications where data from one compute node migrates through tiers of the tree network to a root compute node or where data is multicast from the root to all of the other compute nodes in the tree network. In such a manner, the tree network lends itself to collective operations such as, for example, reduction operations or broadcast operations. The tree network, however, does not lend itself to and is typically inefficient for point-to-point operations.

A rectangular mesh topology connects compute nodes in a three-dimensional mesh, and every node is connected with up to six neighbors through this mesh network. Each compute node in the mesh is addressed by its x, y, and z coordinate. A torus network connects the nodes in a manner similar to the three-dimensional mesh topology, but adds wrap-around links in each dimension such that every node is connected to its six neighbors through this torus network. In computers that use a torus and a tree network, the two networks typically are implemented independently of one another, with separate routing circuits, separate physical links, and separate message buffers. Other network topology often used to connect nodes of a network includes a star, a ring, or a hypercube. While the tree network generally lends itself to collective operations, a mesh or a torus network generally lends itself well for point-to-point communications. Although in general each type of network is optimized for certain communications patterns, those communications patterns may generally be supported by any type of network.

In many of these data communications networks, transfers between source and target nodes generally supports a deposit mechanism that allows a copy of the network packet, as that packet travels along a network axis from the source node to the target node during that transfer, to be provided to each intermediate compute node on that axis between the source node and the target node. That is, the deposit mechanism is so called because a copy of the packet is deposited on each intermediate node between the source and the target node along the same network axis. Employing the deposit mechanism differs from when the deposit mechanism is not used because the only node that receives the network packet for processing is the target node.

Using a deposit mechanism in a three-dimensional rectangular mesh or torus network allows a node to broadcast a network packet to all of the nodes in the network in at least three phases. During the first phase, a compute node broadcasts the packet to all the nodes along an axis in a first dimension of the network. During the second phase, each compute node that has the packet broadcasts the packet along an axis of the second dimension perpendicular to the first dimension. After the second phase, therefore, an entire plane of nodes along the first and second dimensions in the rectangular mesh or torus network has received the network packet. During the third phase, each compute node that has the packet broadcasts the packet along an axis in the third dimension of the network. After the third phase, therefore, all of the nodes in the network have a copy of the network packet for processing. The drawback to this three phase approach, however, is that after each phase, the nodes must synchronize before proceeding to the next phase because some nodes receive the network packet before other nodes in the same phase. For each phase of the broadcast, therefore, some nodes are idle, which introduces synchronization overhead into the system and limits parallelism.

SUMMARY OF THE INVENTION

Methods, systems, and products are disclosed for broadcasting a message in a parallel computer. The parallel computer includes a plurality of compute nodes connected together using a data communications network. The data communications network optimized for point to point data communications and is characterized by at least two dimensions. The compute nodes are organized into at least one operational group of compute nodes for collective parallel operations of the parallel computer. One compute node of the operational group assigned to be a logical root. Broadcasting a message in a parallel computer includes: establishing a Hamiltonian path along all of the compute nodes in at least one plane of the data communications network and in the operational group; and broadcasting, by the logical root to the remaining compute nodes, the logical root's message along the established Hamiltonian path.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
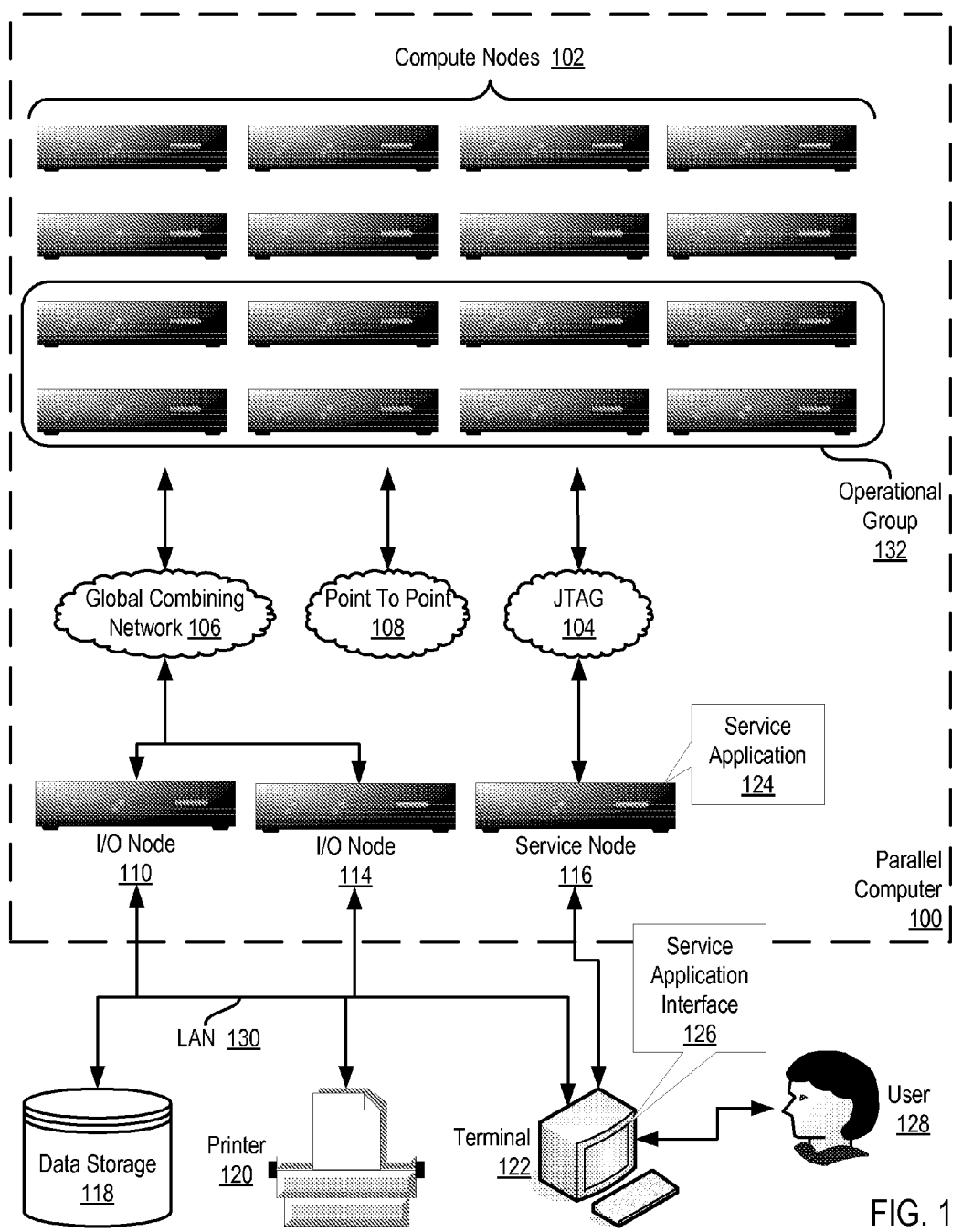
FIG. 1 illustrates an exemplary parallel computer for broadcasting a message in a parallel computer according to embodiments of the present invention.

Exemplary methods, systems, and computer program products for broadcasting a message in a parallel computer according to embodiments of the present invention are described with reference to the accompanying drawings, beginning with FIG. 1. FIG. 1 illustrates an exemplary parallel computer for broadcasting a message in a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a Joint Test Action Group ('JTAG') network (104), a global combining network (106) which is optimized for collective operations, and a rectangular mesh or torus network (108) which is optimized point to point operations. The rectangular mesh or torus network (108) is characterized by at least two dimensions. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

MPI_MAX maximum
MPI_MIN minimum
MPI_SUM sum
MPI_PROD product
MPI_LAND logical and
MPI_BAND bitwise and
MPI_LOR logical or
MPI_BOR bitwise or
MPI_LXOR logical exclusive or
MPI_BXOR bitwise exclusive or In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the parallel computer (100) of FIG. 1 operates generally for broadcasting a message in a parallel computer according to embodiments of the present invention. The parallel computer (100) of FIG. 1 operates generally for broadcasting a message in a parallel computer according to embodiments of the present invention by: establishing a Hamiltonian path along all of the compute nodes in at least one plane of the data communications network and in the operational group; and broadcasting, by the logical root to the remaining compute nodes, the logical root's message along the established Hamiltonian path. The message broadcast by the logical root is the logical root's contribution to a collective operation such as, for example, an all-to-all operation, an allgather operation, and so on. A Hamiltonian path is a path through some or all of the compute nodes in an operational group that passes through each of those compute node exactly once.

The arrangement of nodes, networks, and I/O devices making up the exemplary system illustrated in FIG. 1 are for explanation only, not for limitation of the present invention. Data processing systems capable of broadcasting a message in a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of determining when a set of compute nodes participating in a barrier operation are ready to exit the barrier operation according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Broadcasting a message in a parallel computer according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of broadcasting a message in a parallel computer according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152).

Stored in RAM (156) is an application (158), a module of computer program instructions that carries out parallel, user-level data processing using parallel algorithms. Also stored in RAM (156) is a messaging module (160), a library of computer program instructions that carry out parallel communications among compute nodes, including point to point operations as well as collective operations. Application (158) executes point to point and collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

The application (158) or the messaging module (160) may include computer program instructions for broadcasting a message in a parallel computer according to embodiments of the present invention. The application (158) or the messaging module (160) may operate generally for broadcasting a message in a parallel computer according to embodiments of the present invention by: establishing a Hamiltonian path along all of the compute nodes in at least one plane of the data communications network and in the operational group; and broadcasting, by the logical root to the remaining compute nodes, the logical root's message along the established Hamiltonian path.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
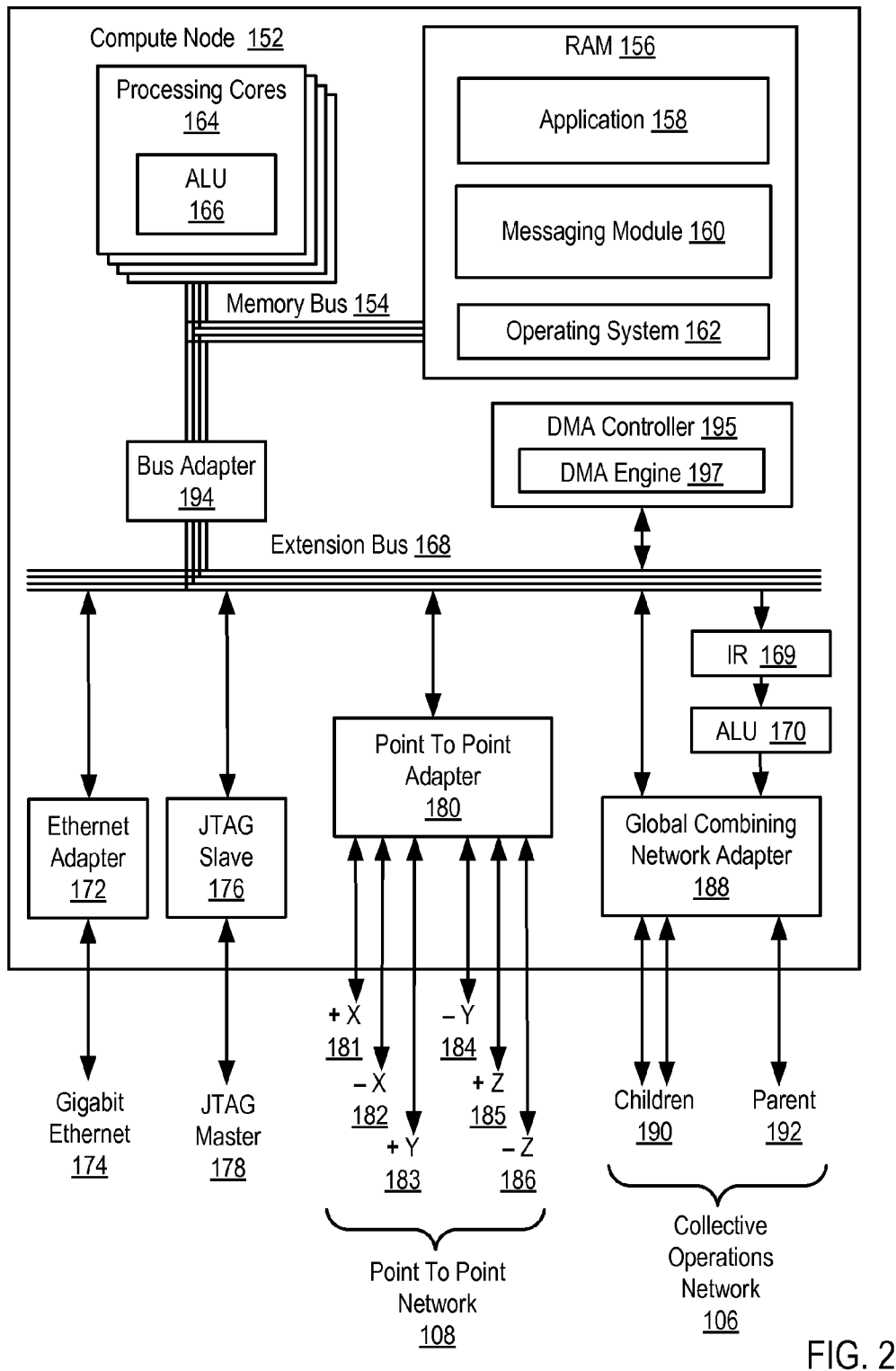
FIG. 2 sets forth a block diagram of an exemplary compute node useful in a parallel computer capable of broadcasting a message in a parallel computer according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for broadcasting a message in a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in broadcasting a message in a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. In the example of FIG. 2, the DMA engine (197) is configured in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

Figure 3A:
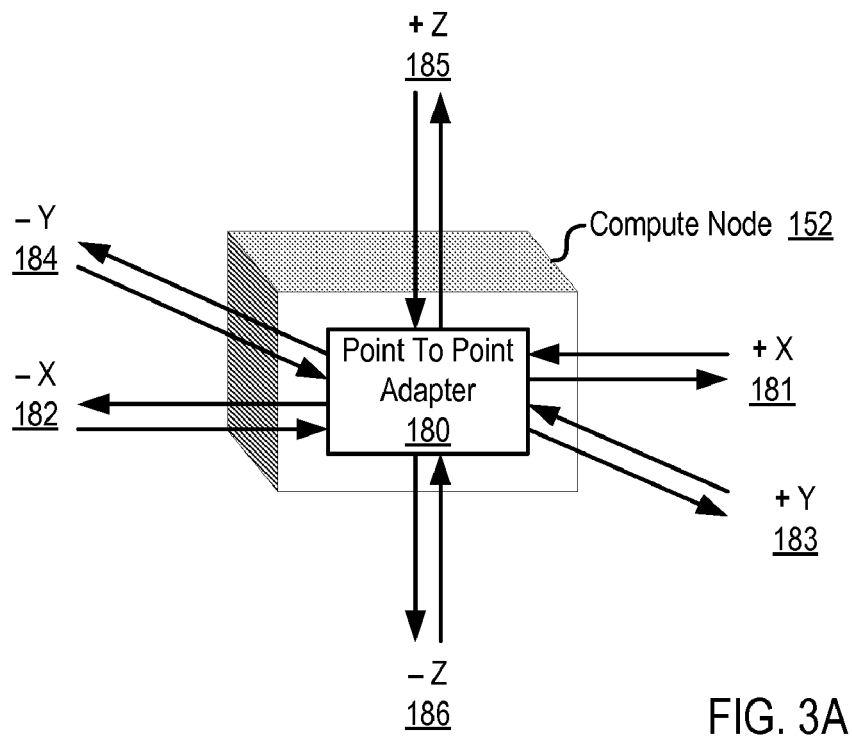
FIG. 3A illustrates an exemplary Point To Point Adapter useful in a parallel computer capable of broadcasting a message in a parallel computer according to embodiments of the present invention.

For further explanation, FIG. 3A illustrates an exemplary Point To Point Adapter (180) useful in a parallel computer capable of broadcasting a message in a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
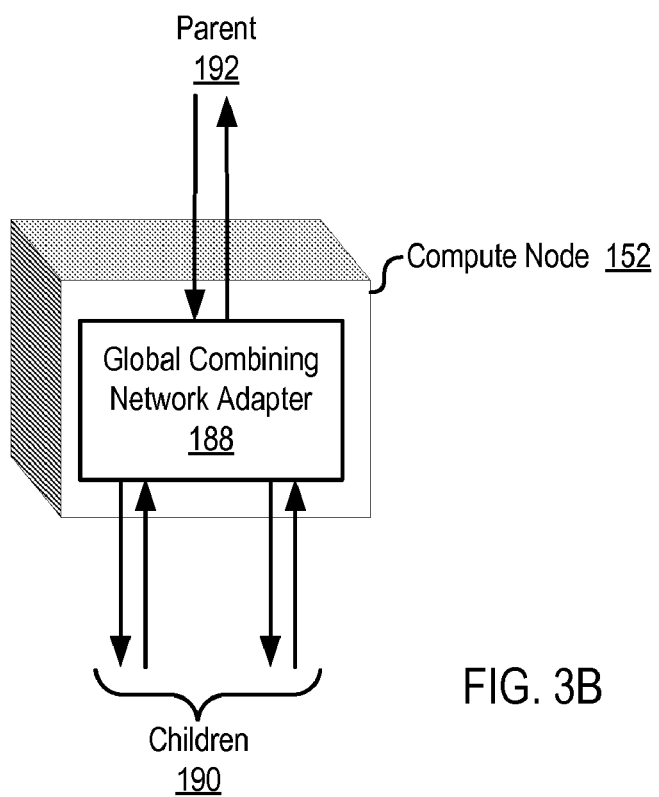
FIG. 3B illustrates an exemplary Global Combining Network Adapter useful in a parallel computer capable of broadcasting a message in a parallel computer according to embodiments of the present invention.

For further explanation, FIG. 3B illustrates an exemplary Global Combining Network Adapter (188) useful in a parallel computer capable of broadcasting a message in a parallel computer according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes (190) through two links. Each link to each child node (190) is formed from two unidirectional data communications paths. Global Combining Network Adapter (188) also provides data communication to and from a parent node (192) through a link form from two unidirectional data communications paths.

Figure 4:
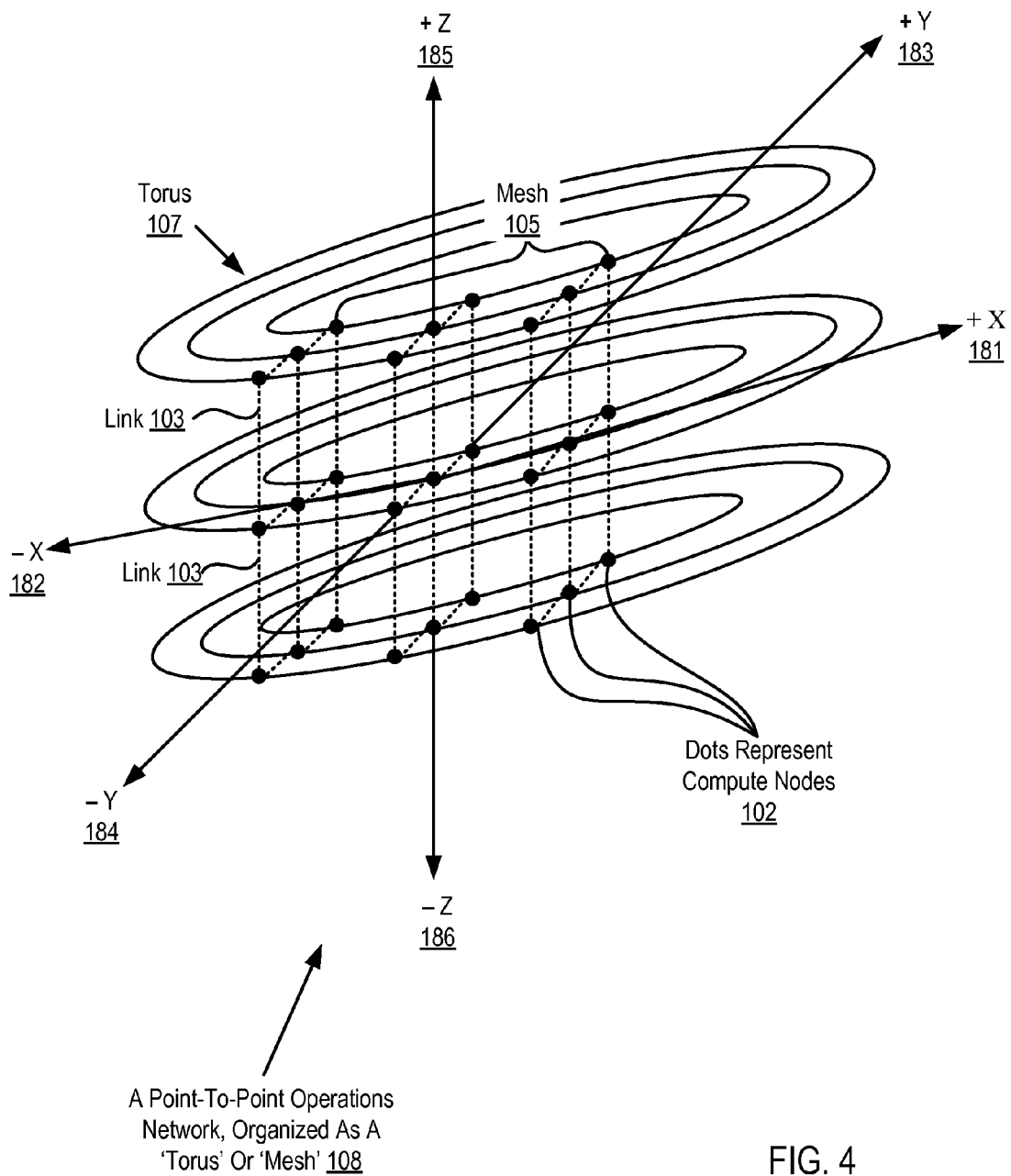
FIG. 4 sets forth a line drawing illustrating an exemplary data communications network optimized for point to point operations useful in a parallel computer capable of broadcasting a message in a parallel computer according to embodiments of the present invention.

For further explanation, FIG. 4 sets forth a line drawing illustrating an exemplary data communications network (108) optimized for point to point operations useful in a parallel computer capable of broadcasting a message in a parallel computer in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and from in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in broadcasting a message in a parallel computer in accordance with embodiments of the present invention may contain only a few compute nodes or may contain thousands of compute nodes.

Figure 5:
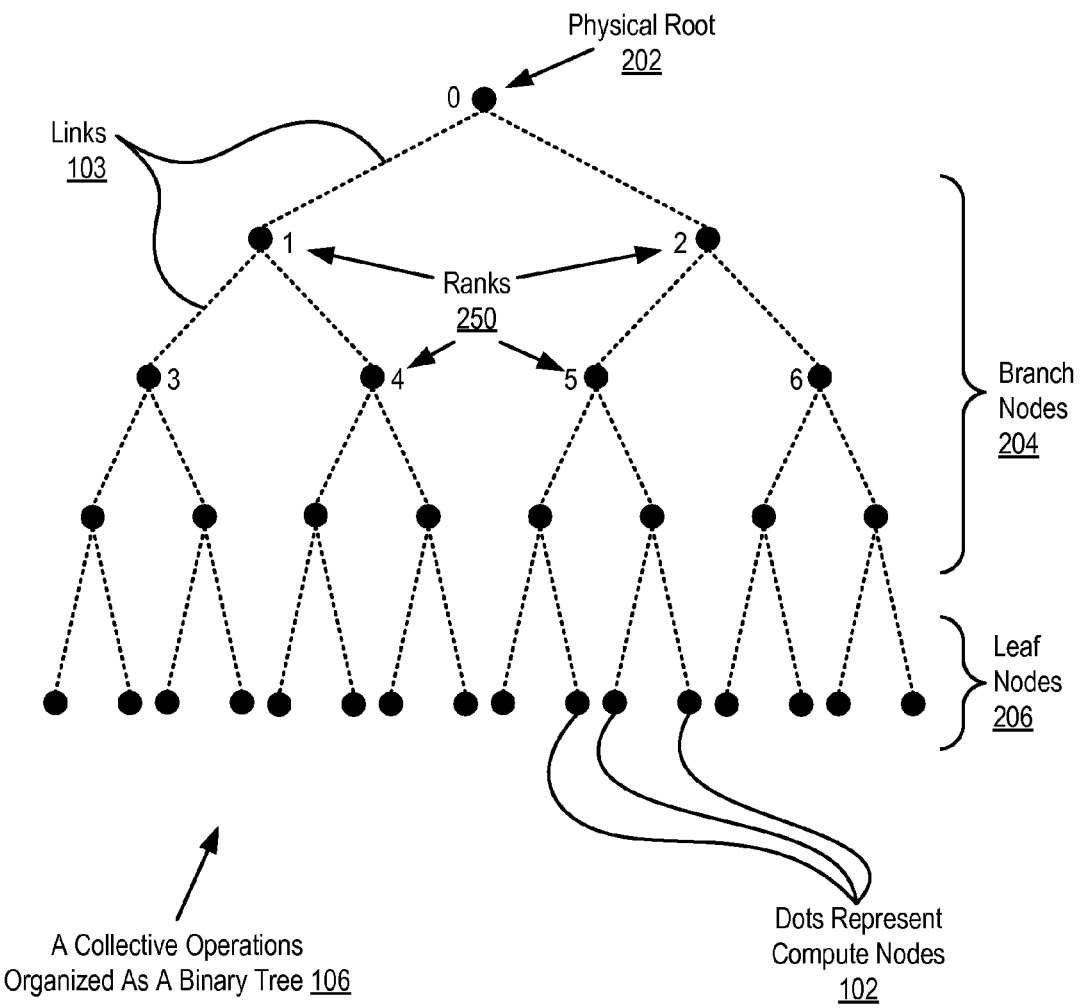
FIG. 5 sets forth a line drawing illustrating an exemplary data communications network optimized for collective operations useful in a parallel computer capable of broadcasting a message in a parallel computer according to embodiments of the present invention.

For further explanation, FIG. 5 sets forth a line drawing illustrating an exemplary data communications network (106) optimized for collective operations useful in a parallel computer capable of broadcasting a message in a parallel computer in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in a parallel computer for broadcasting a message in a parallel computer accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
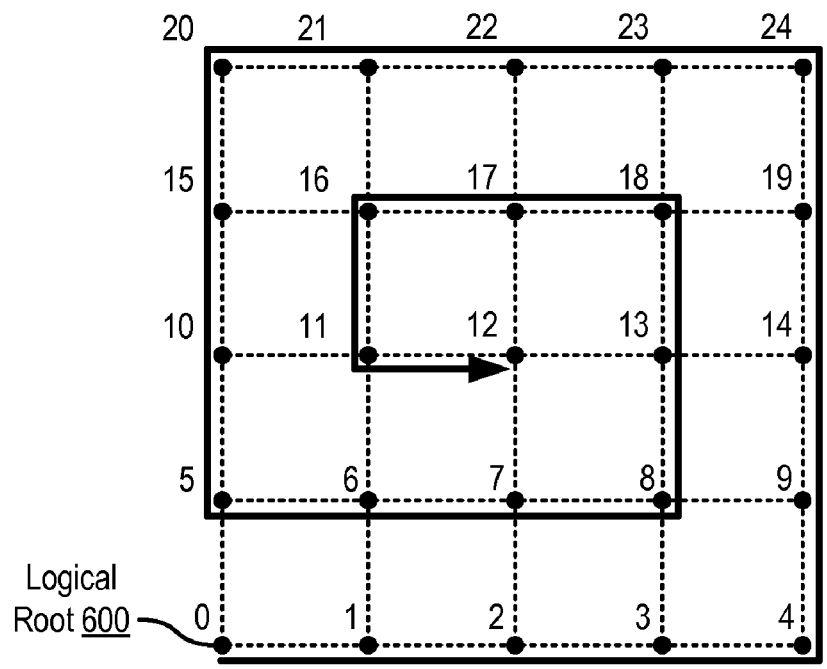
FIG. 6 sets forth a line drawing illustrating an exemplary Hamiltonian path useful in broadcasting a message in a parallel computer according to embodiments of the present invention.
Figure 6:
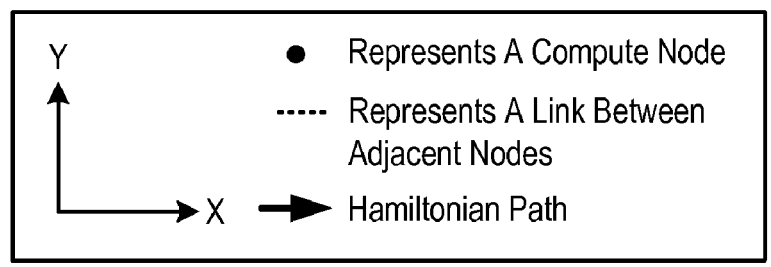

For further explanation, FIG. 6 sets forth a line drawing illustrating an exemplary Hamiltonian path useful in broadcasting a message in a parallel computer according to embodiments of the present invention. FIG. 6 illustrates a parallel computer that includes twenty-five compute nodes organized into an operational group (602) for collective parallel operations of the parallel computer. Compute node 0 of the operational group (602) is assigned to be a logical root (600) because compute node 0 has a message to broadcast to the other compute nodes in the operational group (602). The compute nodes in FIG. 6 are connected together using a data communications network organized as a rectangular mesh. The data communications network is characterized by two dimensions—an X dimension and a Y dimension. That is, the compute nodes 0-24 are configured in a plane along the X dimension and the Y dimension.

In the example of FIG. 6, the Hamiltonian path is represented as an arrow having a tail at the logical root (600) and a head at compute node 12. The Hamiltonian path begins at compute node 0, that is logical root (600), and proceeds along an X axis in the positive direction until reaching compute node 4. At compute node 4, the Hamiltonian path turns and proceeds along a Y axis in the positive direction from compute node 4 to compute node 24. At compute node 24, the Hamiltonian path turns and proceeds along a X axis in the negative direction from compute node 24 to compute node 20. At compute node 20, the Hamiltonian path turns and proceeds along a Y axis in the negative direction from compute node 20 to compute node 5. At compute node 5, the Hamiltonian path turns and proceeds along an X axis in the positive direction from compute node 5 to compute node 8. At compute node 8, the Hamiltonian path turns and proceeds along a Y axis in the positive direction from compute node 8 to compute node 18. At compute node 18, the Hamiltonian path turns and proceeds along an X axis in the negative direction from compute node 18 to compute node 16. At compute node 16, the Hamiltonian path turns and proceeds along a Y axis in the negative direction from compute node 16 to compute node 11. At compute node 11, the Hamiltonian path turns and proceeds along an X axis in the positive direction from compute node 11 to compute node 12.

Because the Hamiltonian path of FIG. 6 consists of multiple segments of compute nodes configured linearly along an axis, the Hamiltonian path of FIG. 6 may be specified as an ordered list of compute nodes that specifies the compute node at the beginning of the Hamiltonian path, the compute nodes at which the Hamiltonian path changes direction, and the compute node at the end of the Hamiltonian path. Again, referring to FIG. 6, the Hamiltonian path illustrated in FIG. 6 may be specified as the following ordered list of compute nodes:

compute node 0
compute node 4
compute node 24
compute node 20
compute node 5
compute node 8
compute node 18
compute node 16
compute node 11
compute node 12.

Readers will note that the exemplary list of compute node above specifies only one Hamiltonian path for the compute nodes 0-24 illustrated in FIG. 6. Other Hamiltonian paths as will occur to those of skill in the art may also be useful in broadcasting a message in a parallel computer according to embodiments of the present invention.

The exemplary list of compute nodes above that specifies an exemplary Hamiltonian path for the compute nodes illustrated in FIG. 6 may be obtained using any number of algorithms as will occur to those of skill in the art. The pseudo code for one such exemplary algorithm for obtaining a Hamiltonian path is as follows:

```
1:   #define X_Axis 0
2:   #define Y_Axis 1
3:
4:   BuildSpiralPath( )
5:   {
6:      Xhead = 0
7:      Yhead = 0
8:      Xtail = X - 1       // X represents the total nodes in X dimension.
9:      Ytail = Y -1        // Y represents the total nodes in Y dimension.
10:     direction = 0
11:     Xstep = Ystep = 0
12:     SpiralPath[ ] = NULL
13:
14:     while (true)
15:        if (NextNodeOnSpiral == false)
16:           break
17:  }
18:
19:  NextNodeOnSpiral( )
20:  {
21:     if (direction % 2 == X_Axis)
22:        {
23:           if (Xstep % 2 == 0)
24:              Add(SpiralPath, <Xtail,Yhead>)
25:           if (Xstep % 2 == 1)
26:              Add(SpiralPath, <Xhead,Ytail>)
27:           Xstep++
28:        }
29:     else if (direction % 2 == Y_Axis)
30:        {
31:           if (Ystep % 2 == 0)
32:              Add(SpiralPath, <Xtail,Ytail>)
33:           if (Ystep % 2 == 1)
34:              {
35:                 if (Ytail - 1 > Yhead)
36:                    {
37:                       Ytail--
38:                       Yhead++
39:                       Add(SpiralPath, <Xhead,Yhead>)
40:                       if (Xtail - 1 > Xhead)
41:                          {
42:                             Xtail--
43:                             Xhead++
44:                          }
45:                       else return false
46:                    }
47:                 else return false
48:              }
49:           Ystep++
50:           direction = X_Axis
51:           return true
52:        }
53:
54:     direction++
55:     if (xhead == xtail || yhead == ytail)
56:        return false
57:     return true
58:  }
```

The pseudo code above includes two functions 'BuildSpiralPath' and 'NextNodeOnSpiral.' The function 'BuildSpiralPath' generates a list of compute nodes in an array called 'SpiralPath' that specifies a Hamiltonian path forming a spiral through all of the nodes in a plane along two dimensions. The function 'BuildSpiralPath' generates a list of compute nodes that form the Hamiltonian path by repeated calling the function 'NextNodeOnSpiral' until there are no nodes remaining in the plane that are not already included in the Hamiltonian path. Readers will note that the exemplary pseudo code above is for explanation only and not for limitation. Any algorithm for generating a Hamiltonian path as will occur to those of skill in the art may also be useful according to embodiments of the present invention.

After the Hamiltonian path through the compute nodes 0-24 in FIG. 6 is generated, the logical root (600) broadcasts the logical root's message along the established Hamiltonian path to the remaining compute nodes 1-24. The logical root (600) may broadcast its message to the remaining nodes by performing a line broadcast of the message to compute node 4 using a deposit mechanism, thereby providing compute nodes 1, 2, and 3 with a copy of the message as the message is transmitted to compute node 4. Upon receiving the message, compute node 4 then performs a line broadcast of the message to compute node 24 using a deposit mechanism, thereby providing compute nodes 9, 14, and 19 with a copy of the message as the message is transmitted to compute node 24. Upon receiving the message, compute node 24 then performs line broadcast of the message to compute node 20 using a deposit mechanism, thereby providing compute nodes 21, 22, 23 with a copy of the message as the message is transmitted to compute node 20. Upon receiving the message, compute node 20 then performs line broadcast of the message to compute node 5 using a deposit mechanism, thereby providing compute nodes 10 and 15 with a copy of the message as the message is transmitted to compute node 5. And so on until compute node 12 receives the message. Using a Hamiltonian path such as the Hamiltonian path illustrated in FIG. 6 to broadcast a message throughout a parallel computer advantageously allows the logical root (600) to send the message to all of the nodes in the operational group (602) in a single phase.

A line broadcast is a type of data transfer between two nodes—a source node and a target node—that reside on the same axis of the network. In a line broadcast, the source node sends a packet to the target node and, as the packet is transferred along the axis to the target node, each intervening node on the axis between the source and target nodes also receives a copy of the packet for processing. Because a copy of the packet is 'deposited' with each intervening packet on the axis between the source and target nodes, a line broadcast is often referred to as data transfer employing a 'deposit mechanism.'

The deposit mechanism employed in a line broadcast typically deposits the message on the intervening nodes along an axis between the source node and the target node without involving the processor on those intervening nodes in the transmission of the message from the source node to the target node. For example, when the compute node 0 performs a line broadcast to compute node 4, the processors on compute nodes 1, 2, and 3 are not interrupted to participate in the transmission between compute nodes 0 and 4. Rather, the network hardware of those compute nodes simply stores a copy of the message in reception buffers for later processing by the processor on those node 1, 2, and 3. Although the processors of these intervening nodes are not involved in the broadcasting the message throughout the parallel computer, the processors of the nodes at which the Hamiltonian path changes direction are involved in broadcasting the message throughout the parallel computer. For example, when compute node 4 receives the message, compute node 4's processor has to repackage the message into packets and then perform a line broadcast of the message to compute node 24 with the deposit mechanism such that compute nodes 9, 14, and 19 receive copies of the message.

Readers will note that each compute node in the operational group (602) of FIG. 6 has a specific role in broadcasting a message through a parallel computer according to embodiments of the present invention. Each compute node is informed of its role in the broadcast by having a copy of the ordered list that specifies the Hamiltonian path. Before the broadcast begins, each compute node may receive a copy of the ordered list that specifies the Hamiltonian path from a service node or each compute node may derive the ordered list using an algorithm such as, for example, the algorithm above.

Figure 7A:
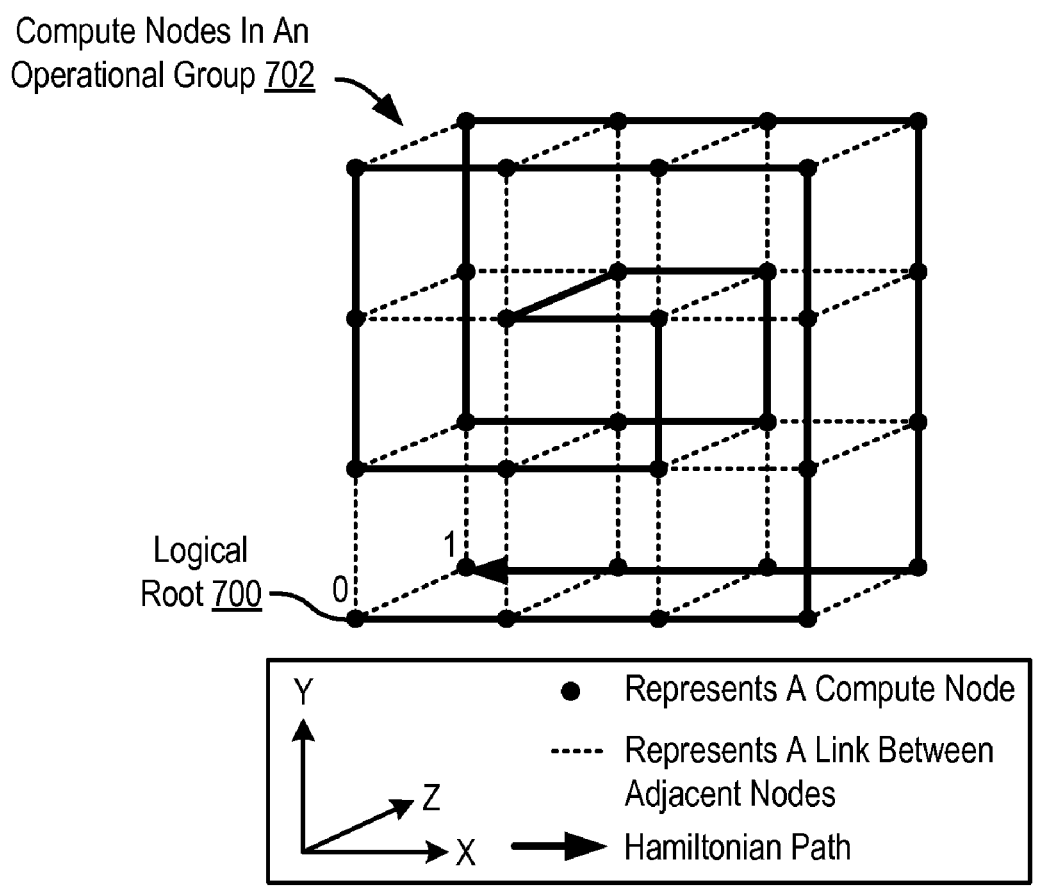
FIG. 7A sets forth a line drawing illustrating a further exemplary Hamiltonian path useful in broadcasting a message in a parallel computer according to embodiments of the present invention.

FIG. 6 illustrates a Hamiltonian path through compute nodes organized in a plane along two dimensions. In other embodiments, however, the compute nodes of a parallel computer may be organized in a network having more than two dimensions. For further explanation, therefore, consider FIG. 7A that sets forth a line drawing illustrating a further exemplary Hamiltonian path useful in broadcasting a message in a parallel computer according to embodiments of the present invention. FIG. 7A illustrates a parallel computer that includes thirty-two compute nodes organized into an operational group (702) for collective parallel operations of the parallel computer. Compute node 0 of the operational group (702) is assigned to be a logical root (700) because compute node 0 has a message to broadcast to the other compute nodes in the operational group (702).

The compute nodes in FIG. 7A are connected together using a data communications network organized as a rectangular mesh. The data communications network is characterized by three dimensions—an X dimension, a Y dimension, and a Z dimension. The X dimension is four nodes in width. The Y dimension is four nodes in height. The Z dimension is two nodes in depth.

The Hamiltonian path illustrated in FIG. 7A begins at the logical root (700), also referred to as compute node 0, and proceeds along in a spiral pattern in X-Y plane that includes compute node 0 in a manner similar to the pattern illustrated in FIG. 6. After traversing all of the nodes in the X-Y plane that includes compute node 0, the Hamiltonian path proceeds along a Z axis to the X-Y plane that includes compute node 1. The Hamiltonian path then continues in a spiral path along all of the nodes in the X-Y plane to conclude at compute node 1. Using a Hamiltonian path such as the Hamiltonian path illustrated in FIG. 7A to broadcast a message throughout a parallel computer advantageously allows the logical root (700) to send the message to all thirty-two nodes in the operational group (702) in a single phase even though the nodes are connected using a network having three dimensions.

Figure 7B:
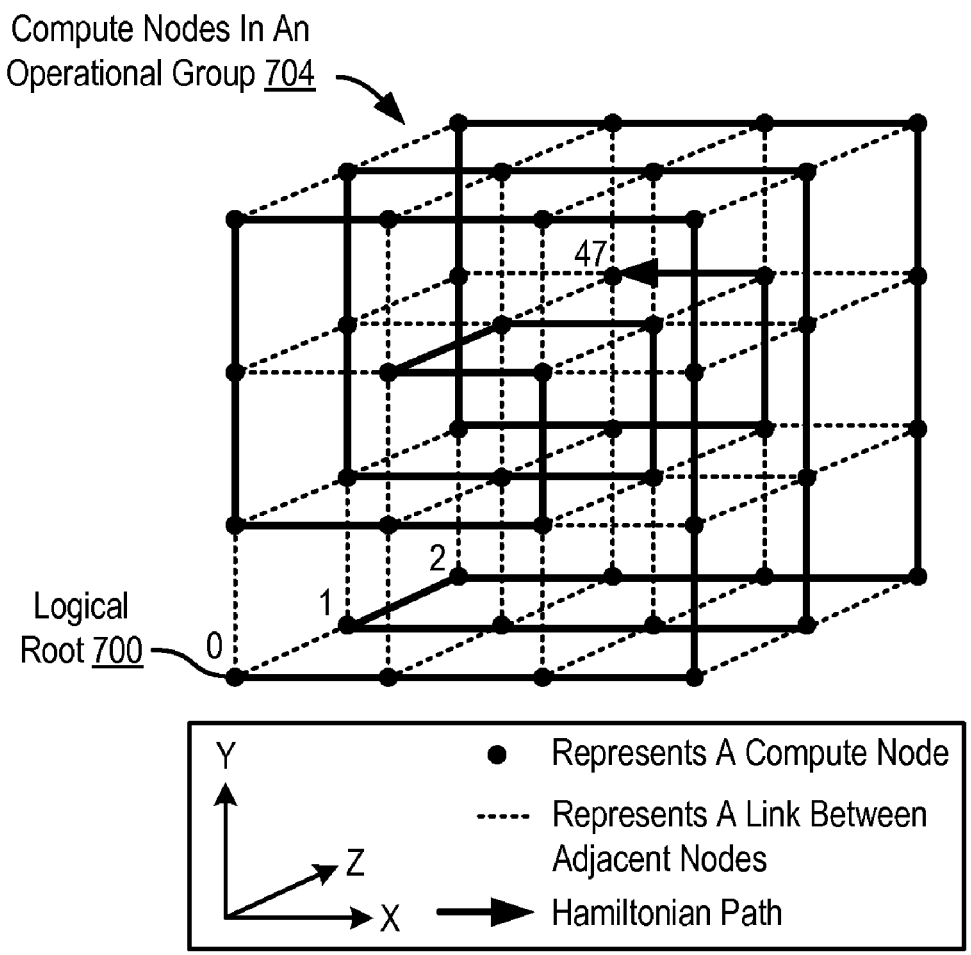
FIG. 7B sets forth a line drawing illustrating a further exemplary Hamiltonian path useful in broadcasting a message in a parallel computer according to embodiments of the present invention.

For further explanation, FIG. 7B sets forth a line drawing illustrating a further exemplary Hamiltonian path useful in broadcasting a message in a parallel computer according to embodiments of the present invention. FIG. 7B illustrates a parallel computer that includes forty-eight compute nodes organized into an operational group (704) for collective parallel operations of the parallel computer. Compute node 0 of the operational group (704) is assigned to be a logical root (700) because compute node 0 has a message to broadcast to the other compute nodes in the operational group (704).

The compute nodes in FIG. 7B are connected together using a data communications network organized as a rectangular mesh. The data communications network is characterized by three dimensions—an X dimension, a Y dimension, and a Z dimension. The X dimension is four nodes in width. The Y dimension is four nodes in height. The Z dimension is three nodes in depth.

The Hamiltonian path illustrated in FIG. 7B begins at the logical root (700), also referred to as compute node 0, and proceeds along in a spiral pattern in X-Y plane that includes compute node 0 in a manner similar to the pattern illustrated in FIG. 7A. After traversing all of the nodes in the X-Y plane that includes compute node 0, the Hamiltonian path proceeds along a Z axis to the X-Y plane that includes compute node 1. The Hamiltonian path then continues in a spiral path along all of the nodes in the X-Y plane to compute node 1 and then proceeds along a Z axis to the X-Y plane that includes compute node 2. The Hamiltonian path then continues in a spiral path along all of the nodes in the X-Y plane to conclude at compute node 47. Using a Hamiltonian path such as the Hamiltonian path illustrated in FIG. 7B to broadcast a message throughout a parallel computer advantageously allows the logical root (700) to send a message to all forty-eight nodes in the operational group (704) in a single phase even though the nodes are connected using a network having three dimensions.

Figure 8:
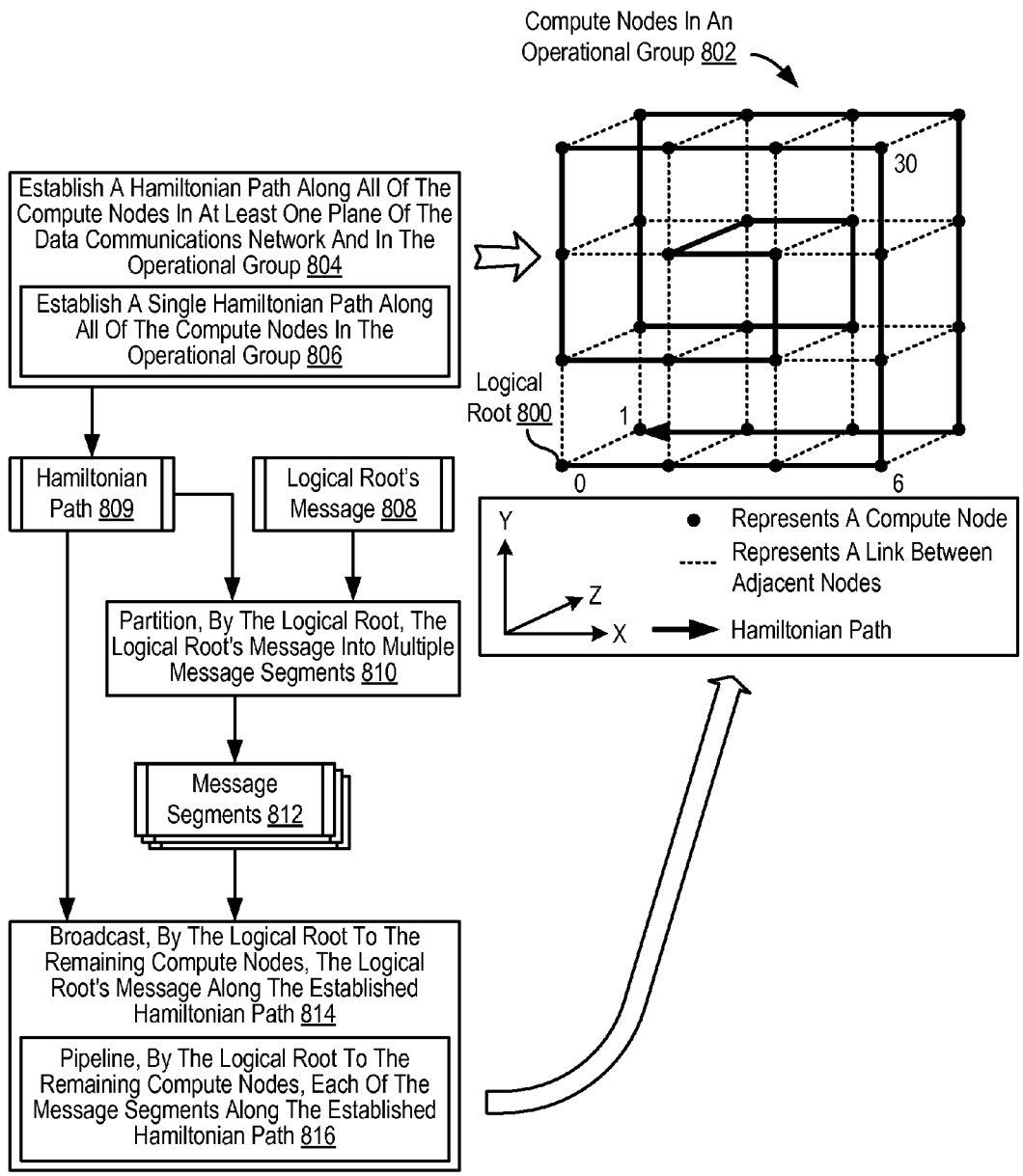
FIG. 8 sets forth a flow chart illustrating an exemplary method for broadcasting a message in a parallel computer according to embodiments of the present invention.

For further explanation, FIG. 8 sets forth a flow chart illustrating an exemplary method for broadcasting a message in a parallel computer according to embodiments of the present invention. The parallel computer described with reference to FIG. 8 includes a plurality of compute nodes connected together using a data communications network. The data communications network is optimized for point to point data communications and is characterized by three dimensions—an X dimension, a Y dimension, and a Z dimension. The X dimension is four nodes in width. The Y dimension is four nodes in height. The Z dimension is two nodes in depth. The compute nodes are organized into an operational group (802) of compute nodes for collective parallel operations of the parallel computer. Compute node 0 of the operational group (802) is assigned to be a logical root (800).

The method of FIG. 8 includes establishing (804) a Hamiltonian path (809) along all of the compute nodes in at least one plane of the data communications network and in the operational group (802). As mentioned above, a Hamiltonian path is a path through some or all of the compute nodes in an operational group that passes through each of those compute nodes exactly once. The Hamiltonian path (809) may be specified as an ordered list of compute nodes included in the Hamiltonian path. Establishing (804) a Hamiltonian path (809) along all of the compute nodes in at least one plane of the data communications network and in the operational group (802) according to the method of FIG. 8 may be carried out by a service node that then provides the ordered list specifying the Hamiltonian path (809) to each of the compute nodes in the operational group (802). In other embodiments, however, establishing (804) a Hamiltonian path (809) along all of the compute nodes in at least one plane of the data communications network and in the operational group (802) according to the method of FIG. 8 may be carried out individually by each compute node in the operational group (802).

Establishing (804) a Hamiltonian path (809) along all of the compute nodes in at least one plane of the data communications network and in the operational group (802) according to the method of FIG. 8 includes establishing (806) a single Hamiltonian path (809) along all of the compute nodes in the operational group (802). Establishing (806) a single Hamiltonian path (809) along all of the compute nodes in the operational group (802) according to the method of FIG. 8 may be carried out by identifying an ordered list of nodes that includes: the node at which the Hamiltonian path begins (typically the logical root); the nodes at each point in the network where the Hamiltonian path changes direction; and the node at which the Hamiltonian path concludes. In the example of FIG. 8, the Hamiltonian path begins at logical root (800), that is, compute node 0, and proceeds through each node of the X-Y plane that include node 0. The Hamiltonian path traverses along the Z axis to the X-Y plane that includes node 1 and proceeds through each node of that plane to finally conclude at compute node 1. Readers will note that the exemplary Hamiltonian path illustrated in FIG. 8 is for explanation alone and not for limitation.

The method of FIG. 8 also includes partitioning (810), by the logical root (800), the logical root's message (808) into multiple message segments (812). The logical root (800) may partition (810) the logical root's message (808) into multiple message segments (812) because of processing delays associated with nodes at which the Hamiltonian path changes direction. Readers will recall from above that when a node at which the Hamiltonian path changes direction receives network packets encapsulating a message from a logical root, that node's processor must repackage the message into a new set of packets and retransmit those new packets along a new axis using a line broadcast. Typically, however, that node cannot repackage the message into the new set of packets for retransmission until that node receives all of the old packets containing the message. In FIG. 8, for example, until node 6 receives all of the packets containing the logical root's message (808) from node 0, node 6 cannot repackage the message (808) into a new set of packets for transmission to node 30 using a line broadcast. When the message (808) is large, excessive delays may be associated with nodes at which the Hamiltonian path changes direction such as, for example, compute node 6. By partitioning (810) the logical root's message (808) into multiple message segments (812), the logical root (800) may reduce or eliminate those delays because the nodes at which the Hamiltonian path changes direction need only wait for these smaller message segments (812) rather than the larger, complete message (808). In such a manner, the logical root (800) may partition (810) the logical root's message (808) into multiple message segments (812) according to the method of FIG. 8 by dividing the message (808) into segments (812) of a size no larger than a particular size threshold. The size threshold may be static or may dynamically changes as network conditions in the parallel computer change.

The method of FIG. 8 includes broadcasting (814), by the logical root (800) to the remaining compute nodes, the logical root's message (808) along the established Hamiltonian path (809). Broadcasting (814), by the logical root (800) to the remaining compute nodes, the logical root's message (808) along the established Hamiltonian path (809) according to the method of FIG. 8 includes pipelining (816), by the logical root (800) to the remaining compute nodes, each of the message segments (812) along the established Hamiltonian path (809). The logical root (800) may pipeline (816) each of the message segments (812) along the established Hamiltonian path (809) to the remaining compute nodes according to the method of FIG. 8 by encapsulating each message segment (812) into a set of packets and line broadcasting those packets with the deposit mechanism to the next node in the Hamiltonian path at which the path changes direction. That next node, at which the path changes direction, receives the message segments (812) one at a time, repackages each message segment (812) into a new set of packets, and performs a line broadcast with the deposit mechanism to the next node in the Hamiltonian path at which the path changes direction. This process continues until the last node in the Hamiltonian path, compute node 1 in FIG. 8, receives each of the message segments (812).

The explanation above with reference to FIGS. 6, 7A, 7B, and 8 describe a logical root broadcasting a message to the remaining compute nodes in an operational group using a single Hamiltonian path that passes through all of the nodes in the operational group. In other embodiments, however, the logical root may broadcast a message to the remaining compute nodes in an operational group using a multiple Hamiltonian paths that together pass through all of the nodes in the operational group. For further explanation, consider FIGS. 9A and 9B that set forth line drawings illustrating exemplary operational group (902) of compute nodes useful in broadcasting a message in a parallel computer according to embodiments of the present invention.

Figure 9A:
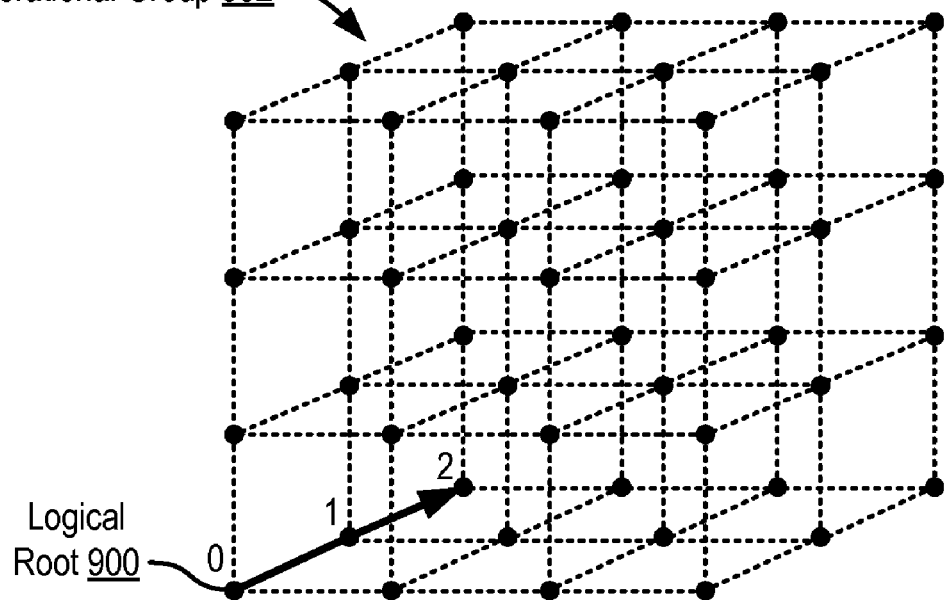
FIG. 9A sets forth a line drawing illustrating an exemplary operational group of compute nodes useful in broadcasting a message in a parallel computer according to embodiments of the present invention.
Figure 9A:
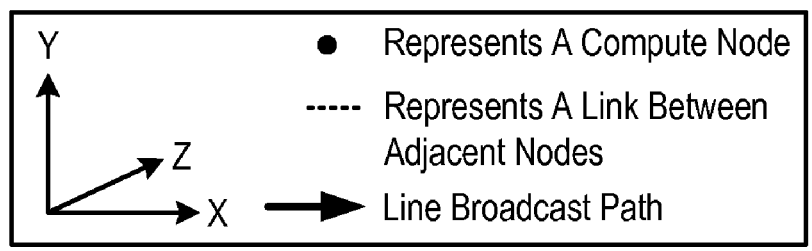
Figure 9B:
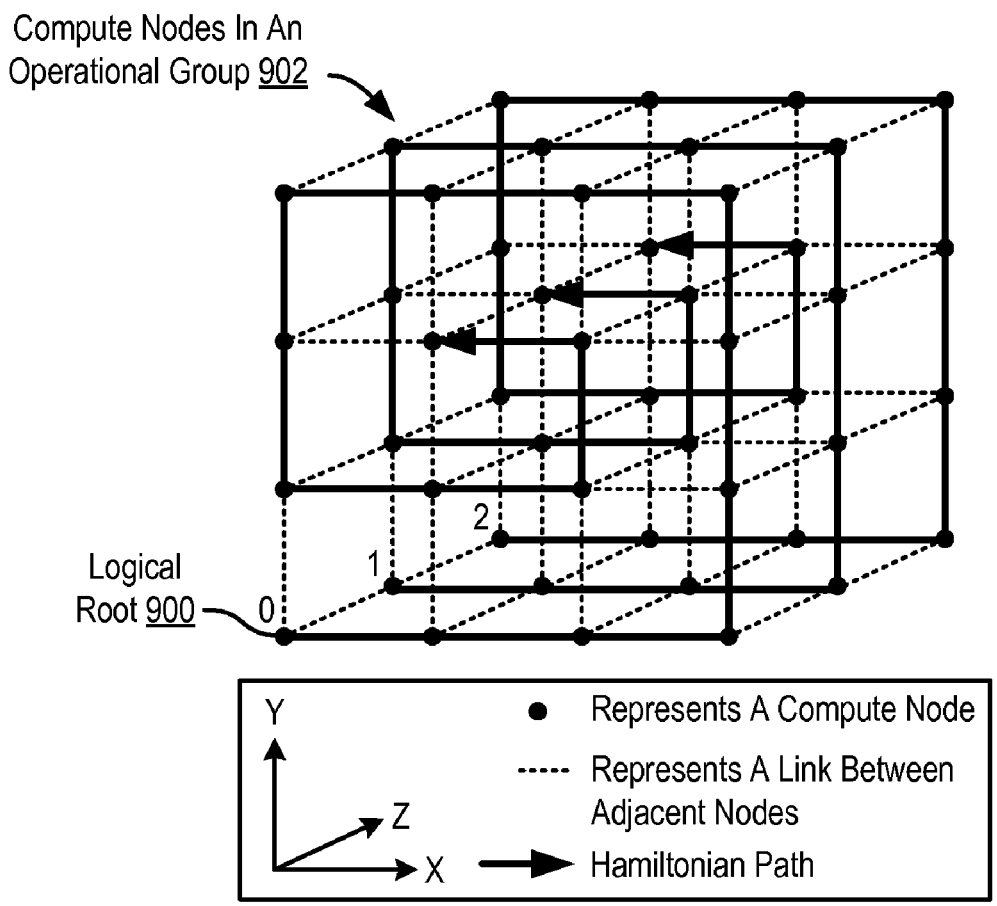
FIG. 9B sets forth a line drawing illustrating an exemplary operational group of compute nodes useful in broadcasting a message in a parallel computer according to embodiments of the present invention.

The operational group (902) of FIGS. 9A and 9B includes forty-eight compute nodes organized for collective parallel operations of the parallel computer. Compute node 0 of the operational group (902) is assigned to be a logical root (900) because compute node 0 has a message to broadcast to the other compute nodes in the operational group (902). The compute nodes in FIGS. 9A and 9B are connected together using a data communications network organized as a rectangular mesh. The data communications network is characterized by three dimensions—an X dimension, a Y dimension, and a Z dimension. The X dimension is four nodes in width. The Y dimension is four nodes in height. The Z dimension is three nodes in depth.

FIG. 9A illustrates the logical root (900) line broadcasting its message along a Z axis to compute node 2. In such a manner, compute node 0, 1, and 2 have copies of the message after the line broadcast. FIG. 9B illustrates each node 0, 1, and 2 transmitting the message to the remaining nodes in their respective X-Y planes through a Hamiltonian path established for each plane. The Hamiltonian path in each plane is established in a manner similar to the Hamiltonian paths described above. Readers will note, however, that the Hamiltonian paths illustrated in FIG. 9B are for explanation only and not for limitation. Using multiple Hamiltonian paths such as the Hamiltonian paths illustrated in FIGS. 9A and 9B to broadcast a message throughout a parallel computer advantageously allows the logical root (900) to send a message to all forty-eight nodes in the operational group (902) in two phases even though the nodes are connected using a network having three dimensions.

Figure 10:
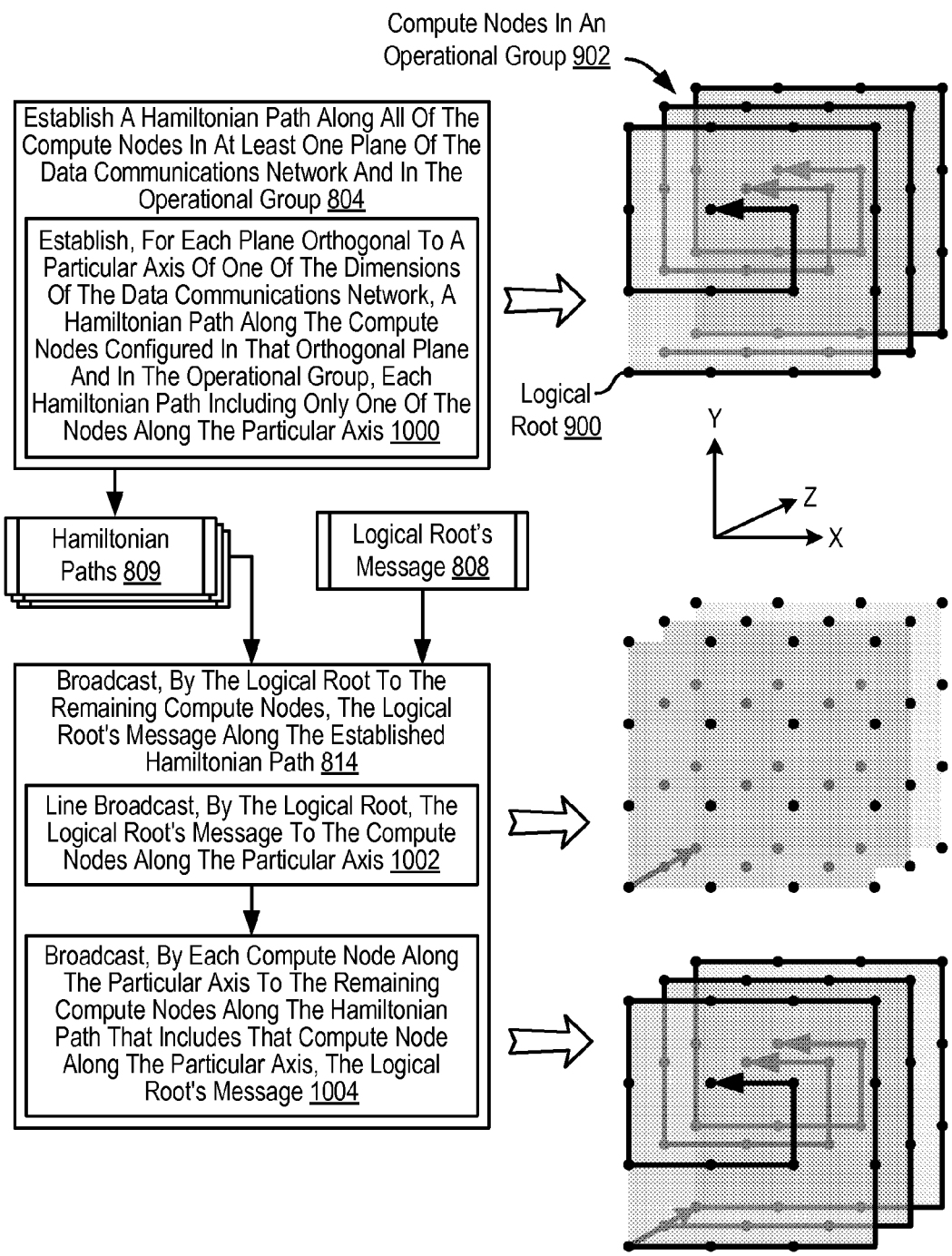
FIG. 10 sets forth a flow chart illustrating a further exemplary method for broadcasting a message in a parallel computer according to embodiments of the present invention.

For further explanation, FIG. 10 sets forth a flow chart illustrating a further exemplary method for broadcasting a message in a parallel computer according to embodiments of the present invention. The parallel computer described with reference to FIG. 10 includes a plurality of compute nodes connected together using a data communications network. The data communications network is optimized for point to point data communications and is characterized by three dimensions—an X dimension, a Y dimension, and a Z dimension. The X dimension is four nodes in width. The Y dimension is four nodes in height. The Z dimension is three nodes in depth. The compute nodes are organized into an operational group (902) of compute nodes for collective parallel operations of the parallel computer. Compute node 0 of the operational group (902) is assigned to be a logical root (900).

The method of FIG. 10 includes establishing (804) a Hamiltonian path (809) along all of the compute nodes in at least one plane of the data communications network and in the operational group (902). Establishing (804) a Hamiltonian path (809) along all of the compute nodes in at least one plane of the data communications network and in the operational group (902) according to the method of FIG. 10 includes establishing (1000), for each plane orthogonal to a particular axis of one of the dimensions of the data communications network, a Hamiltonian path (809) along the compute nodes configured in that orthogonal plane and in the operational group (902). In the example of FIG. 10, the particular axis orthogonally intersected by each plane is the Z axis through the logical root (900). The orthogonal planes therefore are planes along the X and Y dimensions. Each Hamiltonian path orthogonal to the Z axis through the logical root (900) only includes one of the nodes along that particular axis—the Z axis. Because the Z axis is three nodes in depth in the example of FIG. 10, there are three X-Y planes orthogonal to the Z axis, and there are three Hamiltonian paths.

The method of FIG. 10 includes broadcasting (814), by the logical root (900) to the remaining compute nodes, the logical root's message (808) along the established Hamiltonian path (809). Broadcasting (814), by the logical root (900) to the remaining compute nodes, the logical root's message (808) along the established Hamiltonian path (809) according to the method of FIG. 10 includes line broadcasting (1002), by the logical root (900), the logical root's message (808) to the compute nodes along the particular axis. The logical root (900) may broadcast (1002) the logical root's message (808) to the compute nodes along the particular axis according to the method of FIG. 10 by encapsulating the message into packets and transmitting the packets along the particular axis with the deposit mechanism enabled, typically by setting a bit in the header of the packets.

Broadcasting (814), by the logical root (900) to the remaining compute nodes, the logical root's message (808) along the established Hamiltonian path (809) according to the method of FIG. 10 includes broadcasting (1004), by each compute node along the particular axis to the remaining compute nodes along the Hamiltonian path (809) that includes that compute node along the particular axis, the logical root's message (808). Each compute node along the particular axis may broadcast (1004) the logical root's message (808) to the remaining compute nodes along the Hamiltonian path (809) that includes that compute node along the particular axis according to the method of FIG. 10 by encapsulating the message (808) in a set of packets and transmitting, with the deposit mechanism enabled, those packets to the next node along the respective Hamiltonian path at which the path changes direction. Those nodes in each respective X-Y plane that receive the message may then repacketize the message into a new set of packets and transmit, with the deposit mechanism enabled, those packet to the next node along the respective Hamiltonian path at which the path changes direction, and so on as described above.

The explanation above with reference to FIGS. 6, 7A, 7B, 8, 9A, 9B, and 10 describe a logical root broadcasting a message to the remaining compute nodes in an operational group using one or more Hamiltonian paths that passes through all of the nodes in the operational group. In other embodiments, however, the logical root may broadcast a message to the remaining compute nodes in an operational group using a single Hamiltonian path that passes through only a portion of the nodes in the operational group. For further explanation, consider FIGS. 11A and 11B that set forth line drawings illustrating exemplary operational group (1102) of compute nodes useful in broadcasting a message in a parallel computer according to embodiments of the present invention.

Figure 11A:
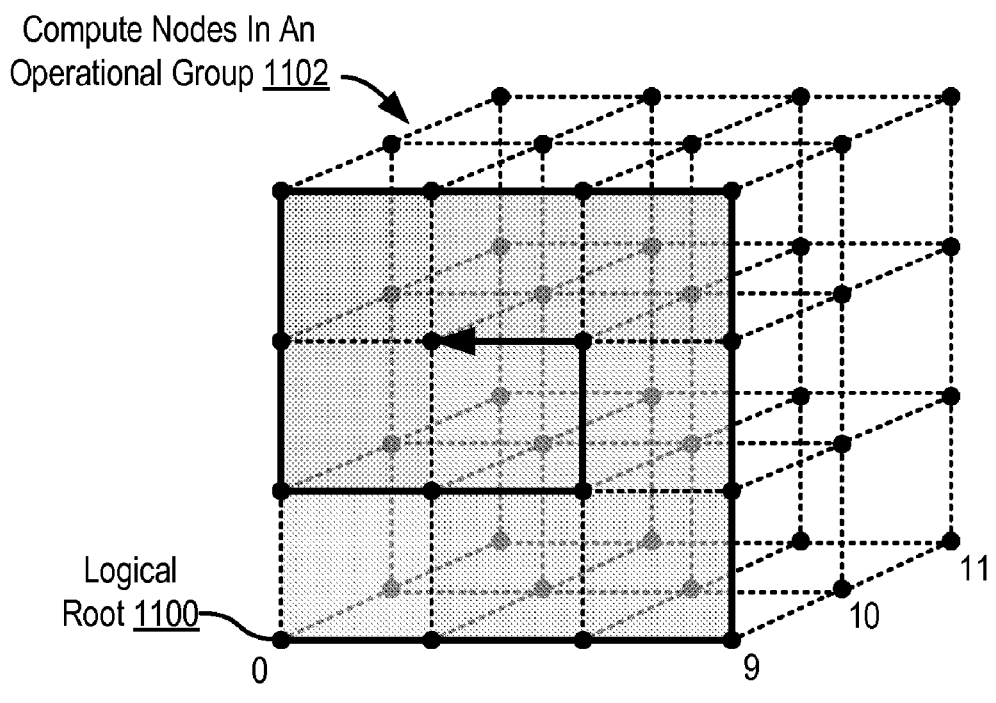
FIG. 11A sets forth a line drawing illustrating an exemplary operational group of compute nodes useful in broadcasting a message in a parallel computer according to embodiments of the present invention.
Figure 11A:
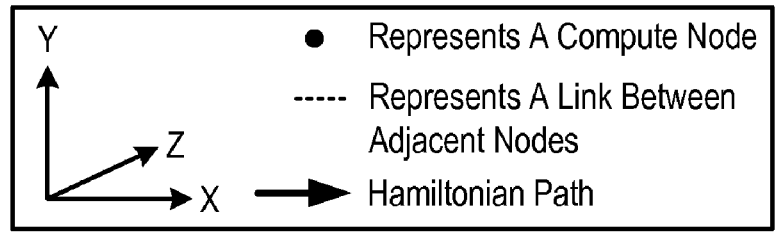
Figure 11B:
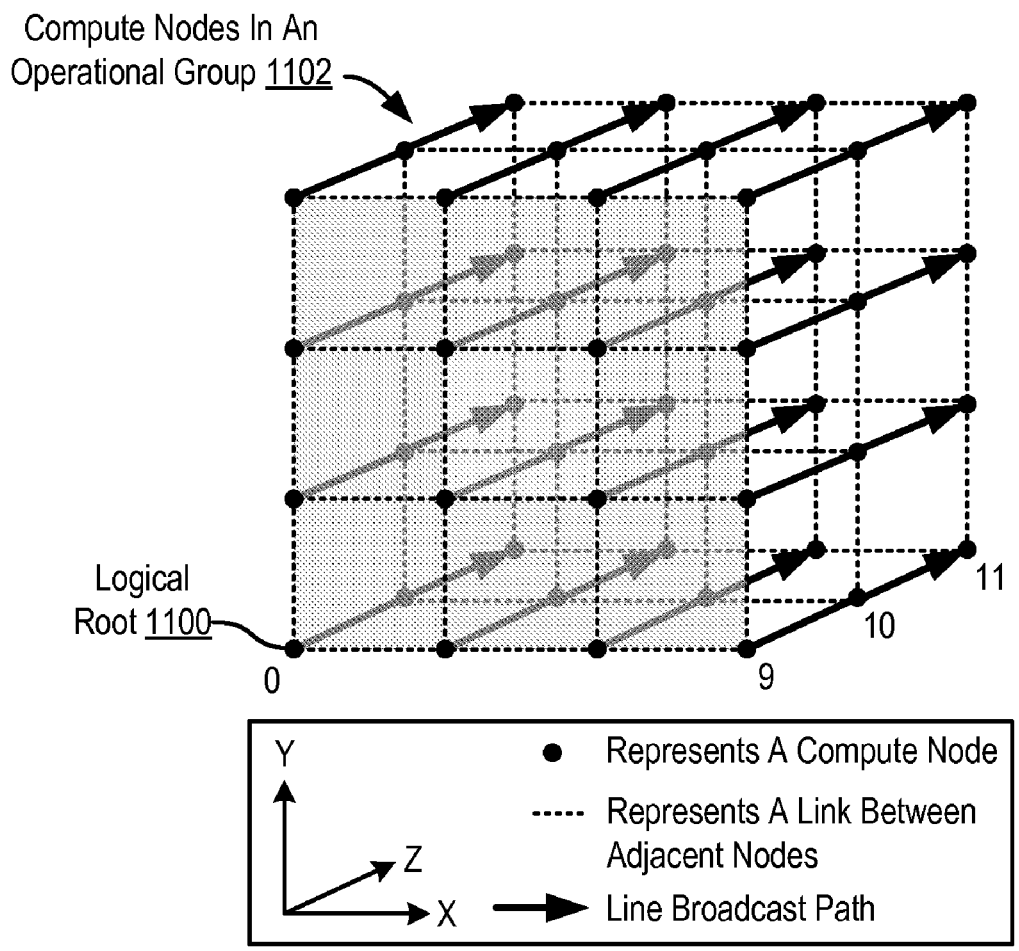
FIG. 11B sets forth a line drawing illustrating an exemplary operational group of compute nodes useful in broadcasting a message in a parallel computer according to embodiments of the present invention.

The operational group (1102) of FIGS. 11A and 11B includes forty-eight compute nodes organized for collective parallel operations of the parallel computer. Compute node 0 of the operational group (1102) is assigned to be a logical root (1100) because compute node 0 has a message to broadcast to the other compute nodes in the operational group (1102). The compute nodes in FIGS. 11A and 11B are connected together using a data communications network organized as a rectangular mesh. The data communications network is characterized by three dimensions—an X dimension, a Y dimension, and a Z dimension. The X dimension is four nodes in width. The Y dimension is four nodes in height. The Z dimension is three nodes in depth.

FIG. 11A illustrates the logical root (900) transmitting its message along a Hamiltonian path through all of the compute nodes in the X-Y plane for compute node 0. FIG. 11B illustrates each node in that X-Y plane for node 0 line broadcasting the logical root's message along the Z axis for each node. The Hamiltonian path in the X-Y plane of compute node 0 is established in a manner similar to the Hamiltonian path described above. Readers will note, however, that the Hamiltonian path illustrated in FIG. 11A is for explanation only and not for limitation. Furthermore, readers will note that using the single Hamiltonian path in combination with multiple line broadcasts as illustrated in FIGS. 11A and 11B advantageously allows the logical root (1100) to send a message to all forty-eight nodes in the operational group (1102) in two phases even though the nodes are connected using a network having three dimensions.

Figure 12:
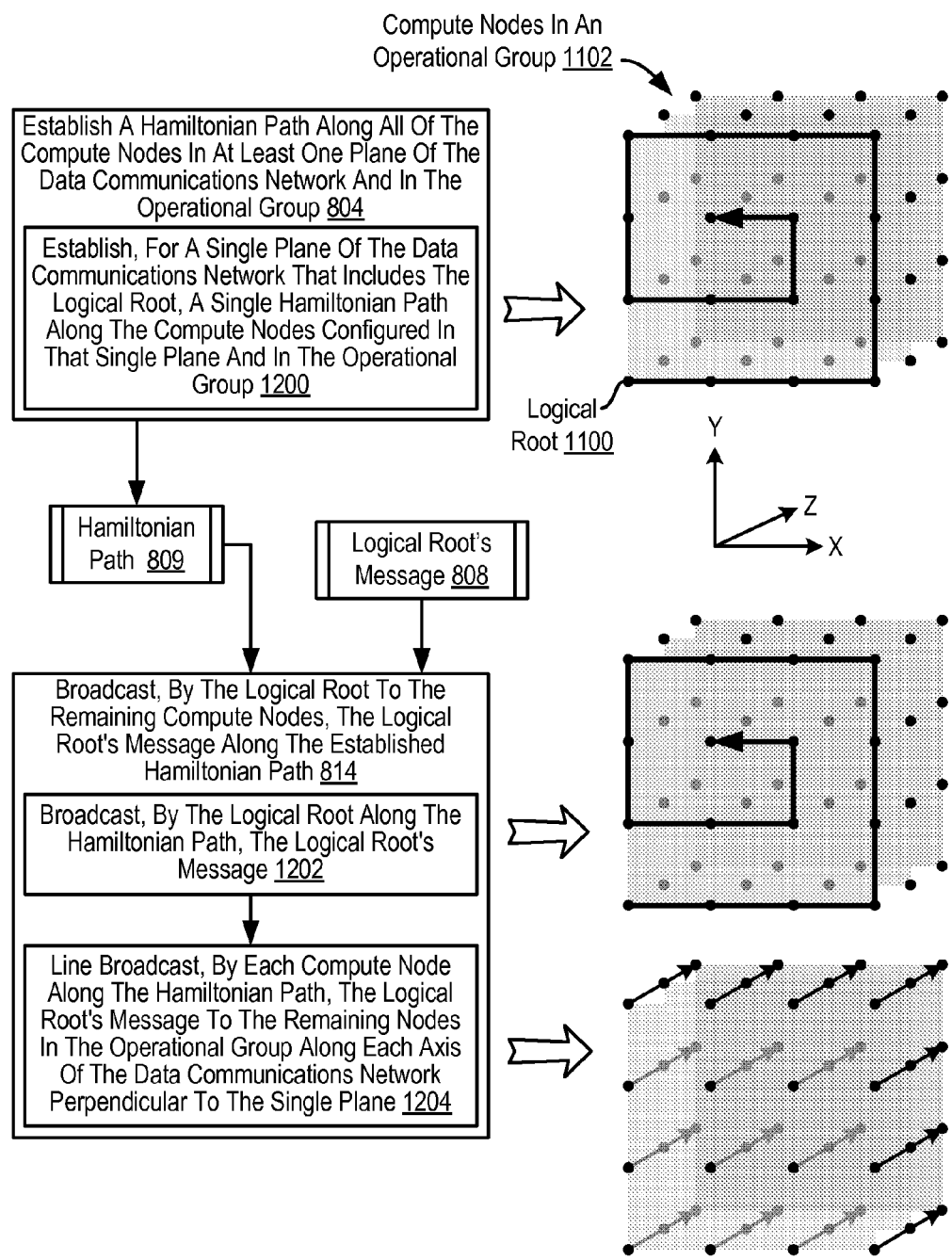
FIG. 12 sets forth a flow chart illustrating a further exemplary method for broadcasting a message in a parallel computer according to embodiments of the present invention.

For further explanation, FIG. 12 sets forth a flow chart illustrating a further exemplary method for broadcasting a message in a parallel computer according to embodiments of the present invention. The parallel computer described with reference to FIG. 12 includes a plurality of compute nodes connected together using a data communications network. The data communications network is optimized for point to point data communications and is characterized by three dimensions—an X dimension, a Y dimension, and a Z dimension. The X dimension is four nodes in width. The Y dimension is four nodes in height. The Z dimension is three nodes in depth. The compute nodes are organized into an operational group (1102) of compute nodes for collective parallel operations of the parallel computer. Compute node 0 of the operational group (1102) is assigned to be a logical root (1100).

The method of FIG. 12 includes establishing (804) a Hamiltonian path (809) along all of the compute nodes in at least one plane of the data communications network and in the operational group (1102). Establishing (804) a Hamiltonian path (809) along all of the compute nodes in at least one plane of the data communications network and in the operational group (1102) according to the method of FIG. 12 includes establishing (1200), for a single plane of the data communications network that includes the logical root (1100), a single Hamiltonian path (809) along the compute nodes configured in that single plane and in the operational group (1102). In the example of FIG. 12, the single plane that includes the logical root (1100) is the X-Y plane. A Hamiltonian path is established along all of the compute nodes in the X-Y plane for the logical root (1100) in the manner previously described above.

The method of FIG. 12 also includes broadcasting (814), by the logical root (1100) to the remaining compute nodes, the logical root's message (808) along the established Hamiltonian path (809). Broadcasting (814), by the logical root (1100) to the remaining compute nodes, the logical root's message (808) along the established Hamiltonian path (809) according to the method of FIG. 12 includes broadcasting (1202), by the logical root (1100) along the Hamiltonian path (809), the logical root's message (808) and line broadcasting (1204), by each compute node along the Hamiltonian path (809), the logical root's message (808) to the remaining nodes in the operational group (1102) along each axis of the data communications network perpendicular to the single plane. Using the single Hamiltonian path in combination with multiple line broadcasts as described above with reference to FIG. 12 advantageously allows the logical root (1100) to send a message to all forty-eight nodes in the operational group (1102) in two phases even though the nodes are connected using a network having three dimensions.

Exemplary embodiments of the present invention are described largely in the context of a fully functional parallel computer system for broadcasting a message in a parallel computer. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of broadcasting a message in a parallel computer, the parallel computer comprising a plurality of compute nodes connected together using a data communications network, the data communications network optimized for point to point data communications, the data communications network characterized by at least two dimensions, the compute nodes organized into at least one operational group of compute nodes for collective parallel operations of the parallel computer, and one compute node of the operational group assigned to be a logical root, the method further comprising:

establishing a Hamiltonian path along all of the compute nodes in at least one plane of the data communications network and in the operational group, including establishing, for each plane orthogonal to a particular axis of one of the dimensions of the data communications network, a Hamiltonian path along the compute nodes configured in that orthogonal plane and in the operational group, each Hamiltonian path including only one of the nodes along the particular axis; and broadcasting, by the logical root to the remaining compute nodes, the logical root's message along the established Hamiltonian path, including line broadcasting, by the logical root, the logical root's message to the compute nodes along the particular axis, and broadcasting, by each compute node along the particular axis to the remaining compute nodes along the Hamiltonian path that includes that compute node along the particular axis, the logical root's message.

2. A method of broadcasting a message in a parallel computer, the parallel computer comprising a plurality of compute nodes connected together using a data communications network, the data communications network optimized for point to point data communications, the data communications network characterized by at least two dimensions, the compute nodes organized into at least one operational group of compute nodes for collective parallel operations of the parallel computer, and one compute node of the operational group assigned to be a logical root, the method further comprising:

establishing a Hamiltonian path along all of the compute nodes in at least one plane of the data communications network and in the operational group, including establishing, for a single plane of the data communications network that includes the logical root, a single Hamiltonian path along the compute nodes configured in that single plane and in the operational group; and broadcasting, by the logical root to the remaining compute nodes, the logical root's message along the established Hamiltonian path, including broadcasting, by the logical root along the Hamiltonian path, the logical root's message, and line broadcasting, by each compute node along the Hamiltonian path, the logical root's message to the remaining nodes in the operational group along each axis of the data communications network perpendicular to the single plane.

3. A parallel computer for broadcasting a message in a parallel computer, the parallel computer comprising a plurality of compute nodes connected together using a data communications network, the data communications network optimized for point to point data communications, the data communications network characterized by at least two dimensions, the compute nodes organized into at least one operational group of compute nodes for collective parallel operations of the parallel computer, and one compute node of the operational group assigned to be a logical root, the plurality of compute nodes comprising a plurality computer processors and computer memory operatively coupled to the computer processors, the computer memory having disposed within it computer program instructions capable of:

establishing a Hamiltonian path along all of the compute nodes in at least one plane of the data communications network and in the operational group further comprises establishing, for each plane orthogonal to a particular axis of one of the dimensions of the data communications network, a Hamiltonian path along the compute nodes configured in that orthogonal plane and in the operational group, each Hamiltonian path including only one of the nodes along the particular axis; and broadcasting, by the logical root to the remaining compute nodes, the logical root's message along the established Hamiltonian path, including line broadcasting, by the logical root, the logical root's message to the compute nodes along the particular axis, and broadcasting, by each compute node along the particular axis to the remaining compute nodes along the Hamiltonian path that includes that compute node along the particular axis, the logical root's message.

4. A parallel computer for broadcasting a message in a parallel computer, the parallel computer comprising a plurality of compute nodes connected together using a data communications network, the data communications network optimized for point to point data communications, the data communications network characterized by at least two dimensions, the compute nodes organized into at least one operational group of compute nodes for collective parallel operations of the parallel computer, and one compute node of the operational group assigned to be a logical root, the plurality of compute nodes comprising a plurality computer processors and computer memory operatively coupled to the computer processors, the computer memory having disposed within it computer program instructions capable of:

establishing a Hamiltonian path along all of the compute nodes in at least one plane of the data communications network and in the operational group further comprises establishing, for a single plane of the data communications network that includes the logical root, a single Hamiltonian path along the compute nodes configured in that single plane and in the operational group; and broadcasting, by the logical root to the remaining compute nodes, the logical root's message along the established Hamiltonian path, including broadcasting, by the logical root along the Hamiltonian path, the logical root's message, and line broadcasting, by each compute node along the Hamiltonian path, the logical root's message to the remaining nodes in the operational group along each axis of the data communications network perpendicular to the single plane.

5. A computer program product for broadcasting a message in a parallel computer, the parallel computer comprising a plurality of compute nodes connected together using a data communications network, the data communications network optimized for point to point data communications, the data communications network characterized by at least two dimensions, the compute nodes organized into at least one operational group of compute nodes for collective parallel operations of the parallel computer, and one compute node of the operational group assigned to be a logical root, the computer program product disposed upon a non-transitory computer readable medium, the computer program product comprising computer program instructions capable of:

establishing a Hamiltonian path along all of the compute nodes in at least one plane of the data communications network and in the operational group further comprises establishing, for each plane orthogonal to a particular axis of one of the dimensions of the data communications network, a Hamiltonian path along the compute nodes configured in that orthogonal plane and in the operational group, each Hamiltonian path including only one of the nodes along the particular axis; and broadcasting, by the logical root to the remaining compute nodes, the logical root's message along the established Hamiltonian path, including line broadcasting, by the logical root, the logical root's message to the compute nodes along the particular axis, and broadcasting, by each compute node along the particular axis to the remaining compute nodes along the Hamiltonian path that includes that compute node along the particular axis, the logical root's message.

6. A computer program product for broadcasting a message in a parallel computer, the parallel computer comprising a plurality of compute nodes connected together using a data communications network, the data communications network optimized for point to point data communications, the data communications network characterized by at least two dimensions, the compute nodes organized into at least one operational group of compute nodes for collective parallel operations of the parallel computer, and one compute node of the operational group assigned to be a logical root, the computer program product disposed upon a non-transitory computer readable medium, the computer program product comprising computer program instructions capable of:

establishing a Hamiltonian path along all of the compute nodes in at least one plane of the data communications network and in the operational group further comprises establishing, for a single plane of the data communications network that includes the logical root, a single Hamiltonian path along the compute nodes configured in that single plane and in the operational group; and broadcasting, by the logical root to the remaining compute nodes, the logical root's message along the established Hamiltonian path, including broadcasting, by the logical root along the Hamiltonian path, the logical root's message, and line broadcasting, by each compute node along the Hamiltonian path, the logical root's message to the remaining nodes in the operational group along each axis of the data communications network perpendicular to the single plane.

* * * * *